US012745148B2

(12) United States Patent
Zhou

(10) Patent No.: US 12,745,148 B2
(45) Date of Patent: Sep. 22, 2026

(54) DEVICE SWITCHING METHOD BASED ON ARTIFICIAL INTELLIGENCE COMPUTING POWER FACTORY VALUE OF ACCESS NETWORK DEVICE, TERMINAL AND NON-TRANSITORY COMPUTER-READABLE STORAGE MEDIUM

(71) Applicant: Beijing Xiaomi Mobile Software Co., Ltd., Beijing (CN)

(72) Inventor: Juejia Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 798 days.

(21) Appl. No.: 18/013,193

(22) PCT Filed: Jul. 1, 2020

(86) PCT No.: PCT/CN2020/099773
§ 371 (c)(1),
(2) Date: Dec. 27, 2022

(87) PCT Pub. No.: WO2022/000379
PCT Pub. Date: Jan. 6, 2022

(65) Prior Publication Data
US 2023/0239756 A1 Jul. 27, 2023

(51) Int. Cl.
*H04W 36/08* (2009.01)
*H04W 36/30* (2009.01)

(52) U.S. Cl.
CPC ......... *H04W 36/08* (2013.01); *H04W 36/302* (2023.05)

(58) Field of Classification Search
CPC ............. H04W 36/08; H04W 36/0083; H04W 36/0085; H04W 36/30; H04W 36/0058; H04W 36/18; H04W 36/0072; H04W 36/0061; H04W 36/0094; H04W 36/302; H04W 36/0016
See application file for complete search history.

(56) References Cited

U.S. PATENT DOCUMENTS

2011/0059741 A1 3/2011 Klein
2016/0037403 A1 2/2016 Kai
2016/0050608 A1* 2/2016 Fan ........................ H04W 92/20 370/280
2020/0112899 A1 4/2020 Mysore Annaiah et al.
(Continued)

FOREIGN PATENT DOCUMENTS

CN 108886734 A 11/2018

OTHER PUBLICATIONS

Examination report for India Application No. 202347005150, issued on Sep. 11, 2023, 5 pages.
(Continued)

*Primary Examiner* — Allahyar Kasraian
(74) *Attorney, Agent, or Firm* — Finnegan, Henderson, Farabow, Garrett & Dunner, L.L.P.

(57) ABSTRACT

A device switching method is applied to a terminal device, and includes: determining a device switching situation of switching between a source access network device and a target access network device by taking an artificial intelligence (AI) computing power factor value of at least one access network device of the source access network device and the target access network device as an offset parameter.

16 Claims, 5 Drawing Sheets determining a device switching situation of switching between access network devices by taking an AI computing power factor value of an access network device as an offset parameter

501

(56) References Cited

U.S. PATENT DOCUMENTS

2021/0194571 A1* 6/2021 Ma .................... H04B 7/18504
2021/0297178 A1* 9/2021 Kim ...................... G06N 3/045

OTHER PUBLICATIONS

International Search Report and Written Opinion of International Application No. PCT/CN2020/099773, mailed Mar. 31, 2021, 12 pages.
Extended European Search Report issued in Application No. 20943156.8 dated Mar. 6, 2024, 10 pages.

* cited by examiner determining a device switching situation of switching between access network devices by taking an AI computing power factor value of an access network device as an offset parameter

501

DEVICE SWITCHING METHOD BASED ON ARTIFICIAL INTELLIGENCE COMPUTING POWER FACTORY VALUE OF ACCESS NETWORK DEVICE, TERMINAL AND NON-TRANSITORY COMPUTER-READABLE STORAGE MEDIUM

CROSS-REFERENCE TO RELATED APPLICATIONS

The present application is a National Stage of International Application No. PCT/CN2020/099773, filed on Jul. 1, 2020, the entire contents of which are incorporated herein by reference.

FIELD

The present disclosure generally relates to the field of communications, and in particular, to a device switching method, apparatus, device, and readable storage medium.

BACKGROUND

When artificial intelligence (AI) technology is deployed on the basis of 6G cellular network, learning ability or computing resource of an edge node may affect implementation of AI applications, such as speech recognition and video understanding.

However, in the related art, when a user terminal (UE) moves in the cellular network, only signal strength or quality of the cellular network is considered for switching between different base stations, and the consideration factor for the device switching process is relatively simple.

SUMMARY

In a first aspect of embodiments of the present disclosure, a device switching method is provided. The method is applied to a terminal device and includes: determining a device switching situation of switching between a source access network device and a target access network device by taking an artificial intelligence (AI) computing power factor value of at least one access network device of the source access network device and the target access network device as an offset parameter.

In a second aspect of embodiments of the present disclosure, a terminal is provided. The terminal includes: a processor; and a memory having stored therein instructions executable by the processor. In case that the instructions are executed by the processor, the processor is configured to implement the device switching method according to the embodiments of the first aspect of the present disclosure.

In a third aspect of embodiments of the present disclosure, a non-transitory computer-readable storage medium is provided, having stored therein at least one instruction, at least one program, a set of codes, or a set of instructions that, when loaded and executed by a processor, causes the processor to implement the device switching method according to the embodiments of the first aspect of the present disclosure.

BRIEF DESCRIPTION OF THE DRAWINGS

In order to illustrate the technical solutions in the embodiments of the present disclosure clearly, accompanying drawings are incorporated in and constitute a part of this specification. It should be noted that the accompanying drawings describe example embodiments of the present disclosure, and those skilled in the art can obtain other embodiments based on the present disclosure.

DETAILED DESCRIPTION

In order to make objectives, technical solutions and advantages of the present disclosure clear, embodiments of the present disclosure will be further described in detail below with reference to the accompanying drawings.

Figure 1:
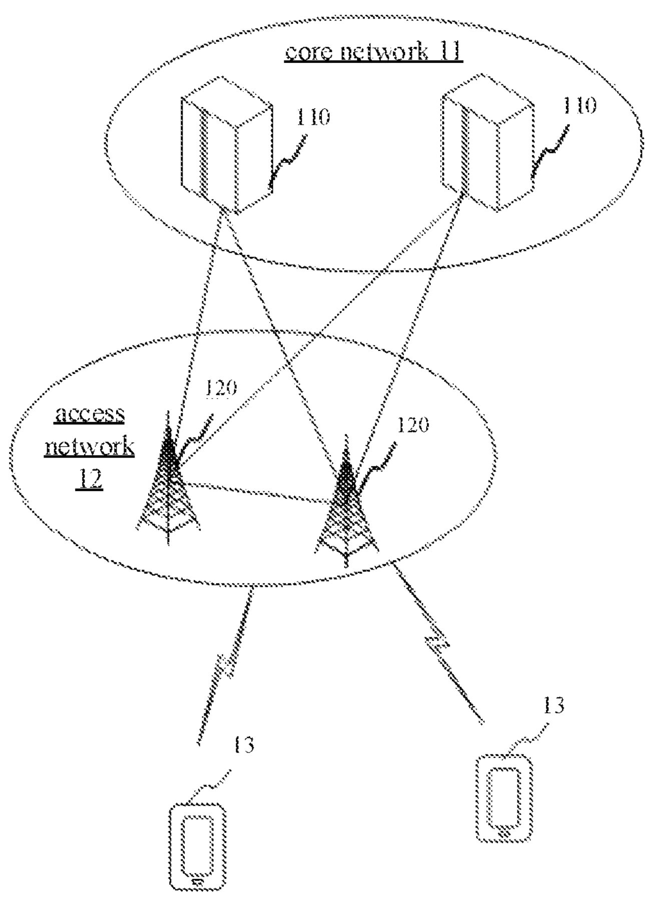
FIG. 1 is a block diagram of a communication system according to an embodiment of the present disclosure.

FIG. 1 shows a block diagram of a communication system according to an embodiment of the present disclosure. The communication system includes a core network 11, an access network 12 and a terminal 13.

The core network 11 includes several core network devices 110. The core network device 110 includes an access and mobility management function (AMF), a session management function (SMF), a user plane management function (UPF) and other devices. The AMF is a control plane function to control access authority and switching for a terminal, the SMF is used to provide server continuity, and thus provide uninterrupted user experience in connection with the server, for example during IP address and anchor point changes.

The access network 12 includes several access network devices 120. In some embodiments, the access network device 120 is a base station, which is a device deployed in an access network to provide a wireless communication function for a terminal. The base station includes various forms of macro base stations, micro base stations, relay stations, and access points. In systems using different wireless access technologies, the name of the device having base station functions may be different. For example, in a long term evolution (LTE) system, it is called eNodeB or eNB. In a 5G new radio (NR) system, it is called gNodeB or gNB. With the development of the communication technology, the name for "base station" may be descriptive and may change. For the ease description of the embodiments of the present disclosure, the foregoing devices for providing a wireless communication function for a terminal are referred to as an access network device.

Optionally, the access network device 120 in the embodiments of the present disclosure has an edge computing capability.

The terminal 13 includes various devices with the wireless communication function, such as handheld devices, vehicle-mounted devices, wearable devices, computing devices or other processing devices connected to a wireless modem, as well as various forms of terminal devices, such as a UE and a mobile station (MS). For the convenience of description, the foregoing devices are referred to as a terminal. The access network device 120 and the terminal 13 communicate with each other through an air interface technology, such as a Uu interface.

Edge computing refers to a computing technology of a distributed computing paradigm that sets up edge nodes on the edge of the network closer the terminal or data source, integrates network, computing, storage, and application core capabilities, and provides an edge intelligent service. Optionally, the edge of the network refers to a server located at the edge of the network (and its corresponding hardware device), which is different from the central server (and its corresponding hardware device) of the network. For example, data sent by a UE is processed at a network edge node. Because the network edge node has a smaller task load and is closer to the UE, the communication effect is better and a corresponding time for processing is faster compared with the case where the data is processed by the network center server. Optionally, in the related art, the network edge may be implemented as a base station gNB.

In the embodiments of the present disclosure, the AI computing power of the edge node is used as an offset factor of the mobility management. For example, an AI computing power of a base station or an upper-layer management network element, such as a control node, mobility management entity (MME), is used as the offset factor of switching between base stations, to allow the UE switches from a current base station to a base station with more available AI computing power without affecting the connectivity.

Optionally, the AI computing power of the edge node indicates a computing capability of the edge node, where the computing capability includes a memory occupancy, a central processing unit (CPU) occupancy or a storage occupancy of the edge node, or an index generated for AI computing and used to indicate an operation ability for the AI computing, which is not limited in the embodiments of the present disclosure.

Optionally, a level of AI computing power deployment on the edge may be a base station level, that is, the AI computing power of the base station is used as the offset factor for the mobility management, or the AI computing power deployment may be performed at a level of an upper-layer management network element (such as MME) which is an upper layer above the base stations.

When the AI computing power is deployed to the base station level, the AI computing power factor is directly marked in the base station. When the AI computing power is deployed to the upper-layer management network element level, the base station managed by the upper-layer management network element can "inherit" the AI computing power of the upper-layer management network element. Inheriting may be performed according to the resource allocation between the base stations, which includes at least one of the following manners.

First, an AI computing power of a subordinate base station is consistent with an AI computing power of an upper-layer management network element.

Figure 2:
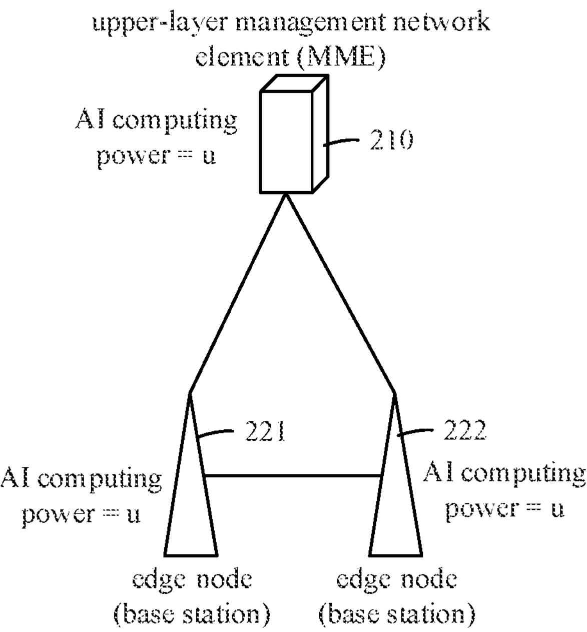
FIG. 2 is schematic diagram of a manner fix allocating an AI computing power value according to an embodiment of the present disclosure.

For example, as shown in FIG. 2, an AI computing power of an upper-layer management network element 210 is u, an AI computing power of an edge node (base station) 221 is u/2, and an AI computing power of an edge node (base station) 222 is also u/2.

Optionally, in the manner, time-frequency resource is divided and used by the subordinate base stations.

Second, the AI computing power of the upper-layer management network element is evenly distributed to the subordinate base stations.

Figure 3:
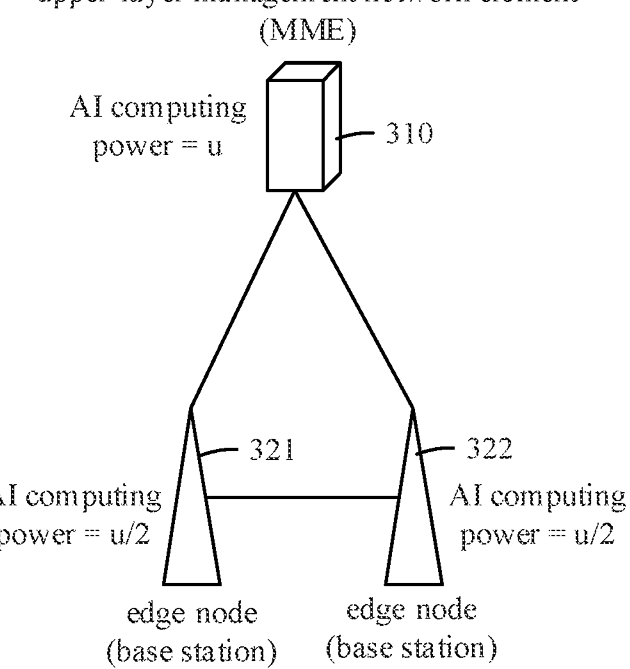
FIG. 3 is schematic diagram of a manner fix allocating an AI computing power value according to another embodiment of the present disclosure.

For example, as shown in FIG. 3, an AI computing power of an upper-layer management network element 310 is u, an AI computing power of an edge node (base station) 321 is u/2, and an AI computing power of an edge node (base station) 322 is also u/2.

Third, the AI computing power of the upper-layer management network element is allocated to the subordinate base stations according to a preset allocation mechanism.

Figures 4, 5:
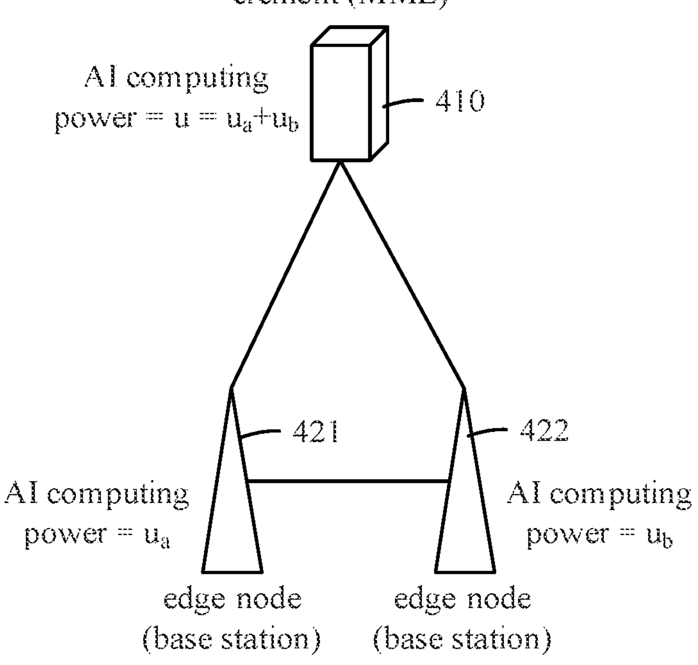
FIG. 4 is schematic diagram of a manner for allocating an AI computing power value according to a further embodiment of the present disclosure.
FIG. 5 is a flow chart of a device switching method according to an embodiment of the present disclosure.

For example, the upper-layer management network element allocates its AI computing power to the subordinate base stations according to a service deployment density of the subordinate base stations. As shown in FIG. 4, an AI computing power of an upper-layer management network element 410 is u, according to the service deployment density, an AI computing power allocated to an edge node (base station) 421 is $u_a$, and an AI computing power of an edge node (base station) 422 is $u_b$, where $u=u_a+u_b$.

It should be noted that the above-mentioned AI computing power refers to the maximum AI computing power of the base station or the upper-layer management network element, or the maximum available AI computing power (i.e., remaining AI computing power) of the base station or the upper-layer management network element in a time period.

Optionally, the upper-layer management network element updates the AI computing power factor value to the edge node (that is, the base station) through a transmission interface connecting with the edge node. For example, the upper-layer management network element updates the AI computing power to the base station through S1 signaling.

FIG. 5 is a flow chart of a device switching method according to an embodiment of the present disclosure. The method is applied to a terminal device as an example for description. As shown in FIG. 5, the method includes an operation in block 501 of determining a device switching situation of switching between a source access network device and a target access network device by taking an artificial intelligence (AI) computing power factor value of at least one access network device of the source access network device and the target access network device as an offset parameter.

Optionally, the AI computing power factor value as the offset parameter is a first AI computing power factor value of the source access network device, a second AI computing power factor value of the target access network device, or a computing power factor difference between the second AI computing power factor value and the first AI computing power factor value. Optionally, the computing power factor difference value is a difference obtained by subtracting the absolute value of the first AI computing power factor value from the absolute value of the second. AI computing power factor value.

Optionally, the terminal receives downlink signaling sent by the access network device, and the downlink signaling includes the AI computing power of the access network device.

Optionally, the AI computing power factor value is the AI computing power of the access network device; or, the AI computing power of the access network device is converted according to a preset conversion method to obtain the AI computing power factor value. The conversion method includes at least one of a linear conversion, an exponential conversion, and a logarithmic conversion. Different conversion methods are described as follows. For example, when the preset conversion method includes the linear conversion, the AI computing power factor value is determined according to the product of a and the AI computing power, where a is a natural number; when the preset conversion method includes the exponential transformation, the AI computing power factor value is determined according to the $a^{th}$ power of the AI computing power; when the preset conversion method includes the logarithmic conversion, the AI computing power factor value is determined with a as the base and the AI computing power as the true number.

Optionally, the preset conversion method is configured by the access network device to the terminal. For example, the preset conversion method is configured by the access network device to the terminal through at least one of physical layer signaling, MAC layer signaling, radio resource control (RRC) layer signaling or broadcast signaling.

The above conversion methods are only examples, and the determination of the AI computing power factor value may be performed in other conversion forms, which are not limited in the embodiments of the present disclosure.

Optionally, the device switching situation is determined by taking the first AI computing power factor value as the offset parameter, and it may be determined in any one of the following situations.

(1.1) In response to determining that the first AI computing power factor value is less than or equal to a first threshold, the device switching situation of switching between the source access network device and the target access network device is determined by taking the first AI computing power factor value as a forward offset parameter.

Optionally, since the first AI computing power factor value reflects the AI computing power of the source access network device, a small first AI computing power factor value indicates that an availability of the AI computing power of the source access network device is low. Based on the first AI computing power factor value, switching offset is performed in a direction of tending to switching, so as to determine whether to switch from the source access network device to the target access network device.

(1.2) In response to determining that the first AI computing power factor value is equal to or greater than a first threshold, the device switching situation of switching between the source access network device and the target access network device is determined by taking the first AI computing power factor value as a reverse offset parameter.

Optionally, when the first AI computing power factor value is equal to or greater than the first threshold (i.e., the first AI computing power factor value is relatively large), it indicates that an availability of the AI computing power of the source access network device is high. Based on the first AI computing power factor value, switching offset is performed in a direction of tending to not switching, so as to determine whether to switch from the source access network device to the target access network device.

It should be noted that when the first AI computing power factor value is equal to the first threshold, the switching offset is performed by taking the first AI computing power factor value as the forward offset parameter or the reverse offset parameter. The offset performed when the first AI computing power factor is equal to the first threshold is not limited in the embodiments of the present disclosure.

Optionally, the device switching situation is determined by taking the second AI computing power factor value as the offset parameter, and it may be determined in any one of the following situations.

(2.1) In response to determining that the second AI computing power factor value is less than or equal to a second threshold, the device switching situation of switching between the source access network device and the target access network device is determined by taking the second AI computing power factor value as a reverse offset parameter.

Optionally, since the second AI computing power factor value reflects the AI computing power of the target access network device, a small second AI computing power factor value indicates that an availability of the AI computing power of the target access network device is low. Based on the second AI computing power factor value, switching offset is performed in a direction of tending to not switching, so as to determine whether to switch from the source access network device to the target access network device.

(2.2) In response to determining that the second AI computing power factor value is equal to or greater than a second threshold, the device switching situation of switching between the source access network device and the target access network device is determined by taking the second AI computing power factor value as a forward offset parameter.

Optionally, when the second AI computing power factor value is equal to or greater than the second threshold (i.e., the second AI computing power factor value is relatively large), it indicates that an availability of the AI computing power of the target access network device is high. Based on the second AI computing power factor value, switching offset is performed in a direction of tending to switching, so as to determine whether to switch from the source access network device to the target access network device.

It should be noted that when the second AI computing power factor value is equal to the second threshold, the switching offset is performed by taking the second AI computing power factor value as the forward offset parameter or the reverse offset parameter. The offset performed when the second AI computing power factor is equal to the second threshold is not limited in the embodiments of the present disclosure.

Optionally, the device switching situation is determined by taking the computing power factor difference as the offset parameter, and it may be determined in any one of the following situations.

(3.1) In response to determining that the computing power factor value difference is equal to or greater than a third threshold, the device switching situation of switching between the source access network device and the target access network device is determined by taking the computing power factor value difference as a forward offset parameter.

Optionally, when the computing power factor value difference is equal to or greater than the third threshold (i.e., the computing power factor value difference is relatively large), it indicates that a relative availability of the AI computing power of the target access network device with respect to the source access network device is high. Based on the computing power factor value difference, switching offset is performed in a direction of tending to switching, so as to determine whether to switch from the source access network device to the target access network device.

(3.2) In response to determining that the computing power factor value difference is less than or equal to a third threshold, the device switching situation of switching between the source access network device and the target access network device is determined by taking the computing power factor value difference as a reverse offset parameter.

Optionally, when the computing power factor value difference is less than or equal to the third threshold, it indicates that there is little difference in the AI computing power between the target access network device and the source access network device. Based on the computing power factor value difference, switching offset is performed in a direction of tending to not switching, so as to determine whether to switch from the source access network device to the target access network device.

It should be noted that when the computing power factor value difference is equal to the third threshold, the switching offset is performed by taking the computing power factor value difference as the forward offset parameter or the reverse offset parameter. The offset performed when the computing power factor value difference is equal to the third threshold is not limited in the embodiments of the present disclosure.

Optionally, the determination manner of the offset parameter is configured by the access network device to the terminal device. For example, the determination manner of the offset parameter is configured by the access network device to the terminal device through at least one of physical layer signaling, MAC layer signaling, RRC layer signaling or broadcast signaling.

Optionally, the above-mentioned first threshold, second threshold or third threshold is configured by the access network device to the terminal device. For example, the first threshold, the second threshold or the third threshold is configured by the access network device to the terminal device through at least one of physical layer signaling, MAC layer signaling, RRC layer signaling or broadcast signaling.

In the above embodiments, as an example for description, a terminal determines whether it should switch from being connected to a source device to a target device. In an optional embodiment, after the terminal determines the AI computing power factor value of the access network device, the terminal reports the AI computing power factor value to the source access network device, the source access network device determines whether to perform the switching; or, after the source access network device determines the AI computing power factor value from the upper-layer management network element, it determines whether to perform the switching according to a reference signal receiving power (RSRP) or a reference signal receiving quality (RSRQ) reported by the terminal.

Therefore, in the device switching method provided in the embodiments, the AI computing power factor value of the access network device is used as the offset parameter. When determining whether to switch from the source access network device to the target access network device, the original determination process is offset according to the AI computing power factor value. In a case where the AI computing power factor value indicates that the AI computing power is suitable for switching, the offset is performed in a forward offset direction to complete the determination of the switching between the access network devices. Similarly, in a case where the AI computing power factor indicates that the AI computing power is not suitable for switching, the offset is performed in a reverse offset direction to complete the determination of the switching between the access network devices. In this way, the accuracy in the process of device switching is improved.

Figure 6:
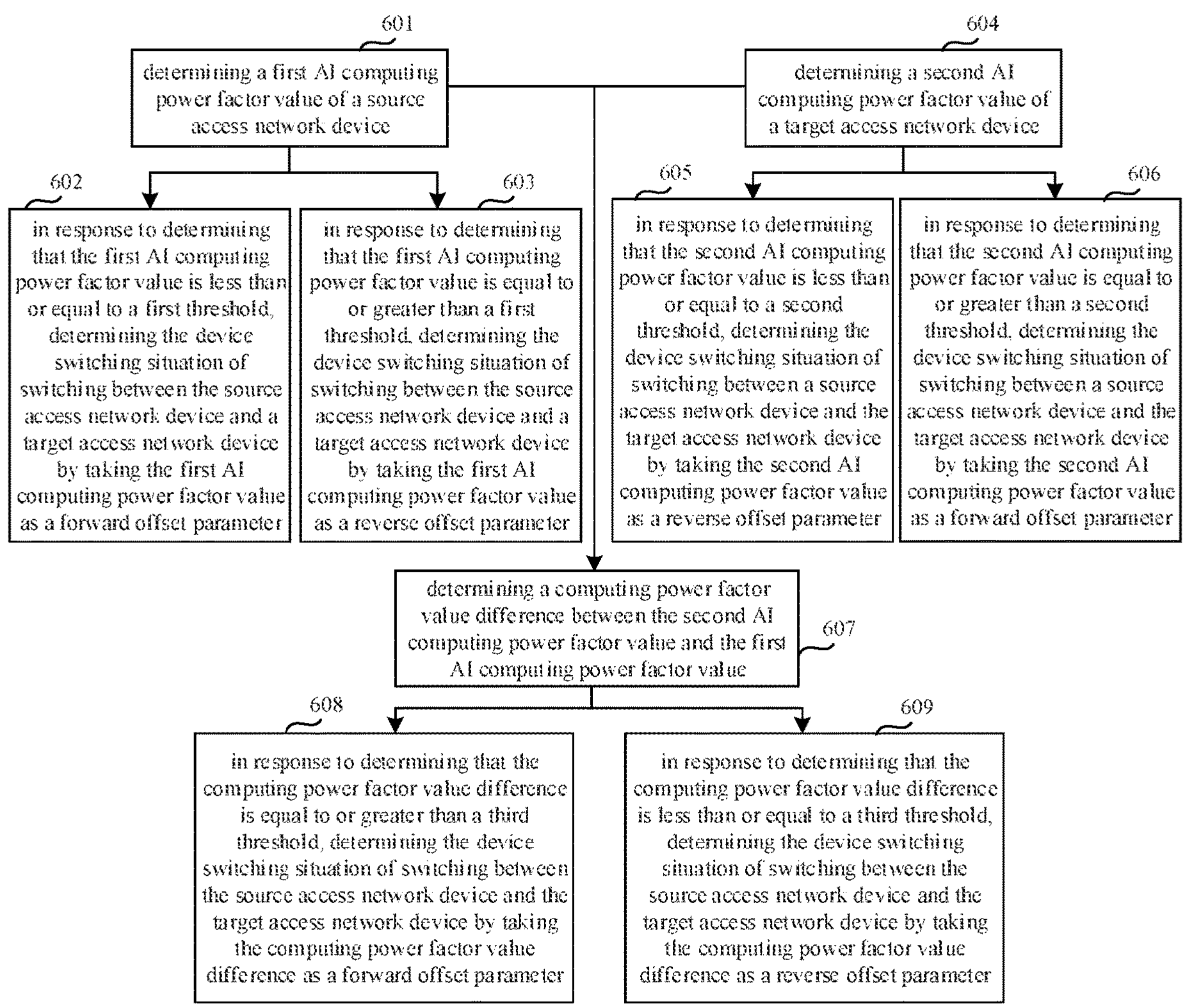
FIG. 6 is a flow chart of a device switching method according to another embodiment of the present disclosure.

In an optional embodiment, the forward offset and the reverse offset are implemented by adjusting a reference switching parameter. FIG. 6 is a flow chart of a device switching method according to an embodiment of the present disclosure. For example, the method is applied in a terminal. As shown in FIG. 6, the method includes the following operations.

In block 601, a first AI computing power factor value of the source access network device is determined.

Optionally, the source access network device sends downlink signaling to the terminal device, and the downlink signaling includes an indication field, where the indication field indicates the first AI computing power factor value of the source access network device.

In block 602, in response to determining that the first AI computing power factor value is less than or equal to a first threshold, the device switching situation of switching between the source access network device and the target access network device is determined by taking the first AI computing power factor value as a forward offset parameter.

Optionally, performing an offset processing by taking the first AI computing power factor value as the forward offset parameter includes at least one of the following situations.

First, in response to determining that a sum of a first reference switching parameter of the target access network device and the first AI computing power factor value reaches a switching threshold, the source access network device is switched to the target access network device.

The first reference switching parameter includes at least one of a reference signal receiving quality (RSRQ) and a reference signal receiving power (RSRP) of the target access network device.

Optionally, in response to determining that the sum of the first reference switching parameter of the target access network device and the first AI computing power factor value is greater than or equal to the switching threshold, the source access network device is switched to the target access network device.

Second, in response to determining that a product of the first reference switching parameter of the target access network device and the first AI computing power factor value reaches a switching threshold, the source access network device is switched to the target access network device.

Optionally, in response to determining that the product of the first reference switching parameter of the target access network device and the first AI computing power factor value is greater than or equal to the switching threshold, the source access network device is switched to the target access network device.

It should be noted that in the above-mentioned first and second comparison processes, as an example for description, the comparison result is between the sum/product value and the switching threshold. The first reference switching parameter and the first AI computing power factor value are calculated in a forward calculation manner, a result obtained from the calculation is compared with the switching threshold. That is, the first reference switching parameter and the first AI computing power factor value are calculated in a forward additive manner, and the calculation result is compared with the switching threshold.

Third, in response to determining that a sum of an opposite number of the first AI computing power factor value and a second reference switching parameter of the source access network device is less than a switching threshold, the source access network device is switched to the target access network device. The second reference switching parameter includes at least one of an RSRQ and an RSRP of the source access network device.

Optionally, in response to determining that the sum of an opposite number of the first AI computing power factor value and the second reference switching parameter of the source access network device is less than or equal to the switching threshold, the source access network device is switched to the target access network device.

Fourth, in response to determining that a ratio of the second reference switching parameter of the source access network device to the first AI computing power factor value is less than a switching threshold, the source access network device is switched to the target access network device.

Optionally, in response to determining that the ratio of the second reference switching parameter of the source access network device to the first AI computing power factor value is less than or equal to the switching threshold, the source access network device is switched to the target access network device.

It should be noted that in the above-mentioned comparison processes, as an example for description, the comparison result is between the difference/ratio value and the switching threshold. The second reference switching parameter and the first AI computing power factor value are calculated in a reverse calculation manner, a result obtained from the calculation is compared with the switching threshold. That is, the second reference switching parameter and the first AI computing power factor value are calculated in a reverse subtractive manner, and the calculation result is compared with the switching threshold.

Fifth, in response to determining that a sum/product of a switching parameter difference and the first AI computing power factor value reaches a switching threshold, the source access network device is switched to the target access network device. The switching parameter difference is a difference between the first reference switching parameter of the access network device and the second reference switching parameter of the source access network device.

Optionally, in response to determining that the sum/product of the switching parameter difference and the first AI computing power factor value is greater than or equal to the switching threshold, the source access network device is switched to the target access network device.

In block 603, in response to determining that the first AI computing power factor value is equal to or greater than a first threshold, the device switching situation of switching between the source access network device and the target access network device is determined by taking the first AI computing power factor value as a reverse offset parameter.

Optionally, performing an offset processing by taking the first AI computing power factor value as the reverse offset parameter includes at least one of the following situations.

First, in response to determining that a sum of an opposite number of the first computing power factor value and the first reference switching parameter of the target access network device reaches a switching threshold, the source access network device is switched to the target access network device.

Optionally, in response to determining that the sum of an opposite number of the first AI computing power factor value and the first reference switching parameter of the target access network device is greater than or equal to the switching threshold, the source access network device is switched to the target access network device.

Second, in response to determining that a ratio of the first reference switching parameter of the target access network device to the first AI computing power factor value reaches a switching threshold, the source access network device is switched to the target access network device.

Optionally, in response to determining that the ratio of the first reference switching parameter of the target access network device to the first AI computing power factor value is greater than or equal to the switching threshold, the source access network device is switched to the target access network device.

Third, in response to determining that a sum of the second reference switching parameter of the source access network device and the first AI computing power factor value is less than a switching threshold, the source access network device is switched to the target access network device.

Optionally, in response to determining that the sum of the second reference switching parameter of the source access network device and the first AI computing power factor value is less than or equal to the switching threshold, the source access network device is switched to the target access network device.

Fourth, in response to determining that a product of the second reference switching parameter of the source access network device and the first AI computing power factor value is less than a switching threshold, the source access network device is switched to the target access network device.

Optionally, in response to determining that the product of the second reference switching parameter of the source access network device and the first AI computing power factor value is less than or equal to the switching threshold, the source access network device is switched to the target access network device.

Fifth, in response to determining that a sum of an opposite number of the first AI computing power factor value and a switching parameter difference reaches a switching threshold, or in response to determining that a ratio of the switching parameter difference and the first AI computing power factor value reaches a switching threshold, the source access network device is switched to the target access network device.

Optionally, the above-mentioned expression of reaching the switching threshold and the like is implemented as being greater than the switching threshold, or, implemented as being greater than or equal to the switching threshold.

In block 604, a second AI computing power factor value of the target access network device is determined.

Optionally, the source access network device sends downlink signaling to the terminal device, and the downlink signaling includes an indication field, where the indication field indicates the second AI computing power factor value of the target access network device.

In block 605, in response to determining that the second AI computing power factor value is less than or equal to a second threshold, the device switching situation of switching between the source access network device and the target access network device is determined by taking the second AI computing power factor value as a reverse offset parameter.

Optionally, performing an offset processing by taking the second AI computing power factor value as the reverse offset parameter includes at least one of the following situations.

First, in response to determining that a sum of an opposite number of the second AI computing power factor value and the first reference switching parameter of the target access network device reaches a switching threshold, the source access network device is switched to the target access network device.

Second, in response to determining that a ratio of the first reference switching parameter of the target access network device to the second AI computing power factor value reaches a switching threshold, the source access network device is switched to the target access network device.

Third, in response to determining that a sum of the second reference switching parameter of the source access network device and the second AI computing power factor value is less than a switching threshold, the source access network device is switched to the target access network device.

Fourth, in response to determining that a product of the second reference switching parameter of the source access network device and the second AI computing power factor value is less than a switching threshold, switching from the source access network device to the target access network device.

Fifth, in response to determining that a sum of an opposite number of the second AI computing power factor value and the switching parameter difference reaches a switching threshold, or in response to determining that a ratio of the switching parameter difference to the second AI computing power factor value reaches a switching threshold, the source access network device is switched to the target access network device.

It should be noted that the above-mentioned expression of reaching the switching threshold and the like is implemented as being greater than the switching threshold, or, implemented as being greater than or equal to the switching threshold. The above-mentioned expression of being less than the switching threshold may be implemented as being less than or equal to the switching threshold.

In block 606, in response to determining that the second AI computing power factor value reaches a second threshold, the device switching situation of switching between the source access network device and the target access network device is determined by taking the second AI computing power factor value as a forward offset parameter.

Optionally, performing an offset processing by taking the second AI computing power factor value as the forward offset parameter includes at least one of the following situations.

First, in response to determining that a sum of the first reference switching parameter of the target access network device and the second AI computing power factor value reaches a switching threshold, the source access network device is switched to the target access network device.

Second, in response to determining that a product of the first reference switching parameter of the target access network device and the second AI computing power factor value reaches a switching threshold, the source access network device is switched to the target access network device.

Third, in response to determining that a sum of an opposite number of the second AI computing power factor value and the second reference switching parameter of the source access network device is less than a switching threshold, switching from the source access network device to the target access network device, the source access network device is switched to the target access network device.

Fourth, in response to determining that a ratio of the second reference switching parameter of the source access network device to the second AI computing power factor value is less than a switching threshold, the source access network device is switched to the target access network device.

Fifth, in response to determining that a sum/product of a switching parameter difference and the second AI computing power factor value reaches a switching threshold, the source access network device is switched to the target access network device. The switching parameter difference is a difference between the first reference switching parameter of the access network device and the second reference switching parameter of the source access network device.

It should be noted that the above-mentioned expression of reaching the switching threshold and the like is implemented as being greater than the switching threshold, or, implemented as being greater than or equal to the switching threshold. The above-mentioned expression of being less than the switching threshold may be implemented as being less than or equal to the switching threshold.

In block 607, a computing power factor value difference between the second AI computing power factor value and the first AI computing power factor value is determined.

Optionally, the computing power factor value difference is obtained by adding an opposite number of the first AI computing power factor value with the second AI computing power factor value, that is, by subtracting the first AI computing power factor value from the second AI computing power factor value.

In block 608, in response to determining that the computing power factor value difference is reaches a third threshold, the device switching situation of switching between the source access network device and the target access network device is determined by taking the computing power factor value difference as a forward offset parameter.

Optionally, performing an offset processing by taking the computing power factor value difference as the forward offset parameter includes at least one of the following situations.

First, in response to determining that a sum of the switching parameter difference and the computing power factor value difference reaches a switching threshold, the source access network device is switched to the target access network device.

Second, in response to determining that a product of the switching parameter difference and the computing power factor value difference reaches a switching threshold, the source access network device is switched to the target access network device.

Third, in response to determining that a sum/product of the first reference switching parameter of the target access network device and the computing power factor value difference reaches a switching threshold, the source access network device is switched to the target access network device.

Fourth, in response to determining that a sum of an opposite number of the computing power factor value difference and the second reference switching parameter is less than a switching threshold, the source access network device is switched to the target access network device.

Fifth, in response to determining that a ratio of the second reference switching parameter to the computing power factor value difference is less than a switching threshold, the source access network device is switched to the target access network device.

It should be noted that the above-mentioned expression of reaching the switching threshold and the like is implemented as being greater than the switching threshold, or, implemented as being greater than or equal to the switching threshold. The above-mentioned expression of being less than the switching threshold may be implemented as being less than or equal to the switching threshold.

In block 609, in response to determining that the computing power factor value difference is less than a third threshold, the device switching situation of switching between the source access network device and the target access network device is determined by taking the computing power factor value difference as a reverse offset parameter.

Optionally, performing an offset processing by taking the computing power factor value difference as the reverse offset parameter includes at least one of the following situations.

First, in response to determining that a sum of an opposite number of the computing power factor value difference and the switching parameter difference reaches a switching threshold, the source access network device is switched to the target access network device.

Second, in response to determining that a ratio of the switching parameter difference to the computing power factor value difference reaches a switching threshold, the source access network device is switched to the target access network device.

Third, in response to determining that a sum of an opposite number of the computing power factor value difference and the first reference switching parameter reaches a switching threshold, the source access network device is switched to the target access network device.

Fourth, in response to determining that a ratio of the first reference switching parameter to the computing power factor value difference reaches a switching threshold, the source access network device is switched to the target access network device.

Fifth, in response to determining that a sum/product of the second reference switching parameter and the computing power factor value difference is less than a switching threshold, the source access network device is switched to the target access network device.

It should be noted that the above-mentioned expression of reaching the switching threshold and the like is implemented as being greater than the switching threshold, or, implemented as being greater than or equal to the switching threshold. The above-mentioned expression of being less than the switching threshold may be implemented as being less than or equal to the switching threshold.

It should be noted that the above embodiments are described as the switching happens between the base stations. When the terminal initializes access to a base station, the access to the base station may also be determined according to the AI computing power factor value and the reference access parameter (such as the RSRP and the RSRQ).

Therefore, in the device switching method provided in the embodiments, the AI computing power factor value of the access network device is used as the offset parameter. When determining whether to switch from the source access network device to the target access network device, the original determination process is offset according to the AI computing power factor value. In a case where the AI computing power factor value indicates that the AI computing power is suitable for switching, the offset is performed in a forward offset direction to complete the determination of the switching between the access network devices. Similarly, in a case where the AI computing power factor indicates that the AI computing power is not suitable for switching, the offset is performed in a reverse offset direction to complete the determination of the switching between the access network devices. In this way, the accuracy in the process of device switching is improved.

Figure 7:
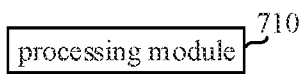
FIG. 7 is a block diagram of a device switching apparatus according to an embodiment of the present disclosure.

FIG. 7 is a block diagram of a device switching apparatus according to an embodiment of the present disclosure. As shown in FIG. 7, the apparatus includes a processing module 710 configured to determine a device switching situation of switching between a source access network device and a target access network device by taking an AI computing power factor value of at least one access network device of the source access network device and the target access network device as an offset parameter.

In an optional embodiment, the processing module 710 is further configured to determine a first AI computing power factor value of the source access network device; and the processing module 710 is further configured to, in response to determining that the first AI computing power factor value is less than or equal to a first threshold, determine the device switching situation of switching between the source access network device and the target access network device by taking the first AI computing power factor value as a forward offset parameter.

In an optional embodiment, the processing module 710 is further configured to, in response to determining that a sum of a first reference switching parameter of the target access network device and the first AI computing power factor value reaches a switching threshold, switch from the source access network device to the target access network device, in which the first reference switching parameter includes at least one of a reference signal receiving quality (RSRQ) and a reference signal receiving power (RSRP) of the target access network device; or the processing module 710 is further configured to, in response to determining that a product of the first reference switching parameter of the target access network device and the first AI computing power factor value reaches a switching threshold, switch from the source access network device to the target access network device; or the processing module 710 is further configured to, in response to determining that a sum of an opposite number of the first AI computing power factor value and a second reference switching parameter of the source access network device is less than a switching threshold, switch from the source access network device to the target access network device, in which the second reference switching parameter includes at least one of an RSRQ and an RSRP of the source access network device; or the processing module 710 is further configured to, in response to determining that a ratio of the second reference switching parameter of the source access network device to the first AI computing power factor value is less than a switching threshold, switch from the source access network device to the target access network device.

In an optional embodiment, the processing module 710 is further configured to determine a first AI computing power factor value of the source access network device; and, in response to determining that the first AI computing power factor value is equal to or greater than a first threshold, determine the device switching situation of switching between the source access network device and the target access network device by taking the first AI computing power factor value as a reverse offset parameter.

In an optional embodiment, processing module 710 is further configured to, in response to determining that a sum of an opposite number of the first AI computing power factor value and a first reference switching parameter of the target access network device reaches a switching threshold, switch from the source access network device to the target access network device, in which the first reference switching parameter includes at least one of an RSRQ and an RSRP of the target access network device; or the processing module 710 is further configured to, in response to determining that a ratio of the first reference switching parameter of the target access network device to the first AI computing power factor value reaches a switching threshold, switch from the source access network device to the target access network device; or the processing module 710 is further configured to, in response to determining that a sum of a second reference switching parameter of the source access network device and the first AI computing power factor value is less than a switching threshold, switch from the source access network device to the target access network device, in which the second reference switching parameter includes at least one of an RSRQ and an RSRP of the source access network device; or the processing module 710 is further configured to, in response to determining that a product of the second reference switching parameter of the source access network device and the first AI computing power factor value is less than a switching threshold, switch from the source access network device to the target access network device.

In an optional embodiment, the processing module 710 is further configured to determine a second AI computing power factor value of the target access network device; and, in response to determining that the second AI computing power factor value is less than or equal to a second threshold, determine the device switching situation of switching between the source access network device and the target access network device by taking the second AI computing power factor value as a reverse offset parameter.

In an optional embodiment, the processing module 710 is further configured to, in response to determining that a sum of an opposite number of the second AI computing power factor value and a first reference switching parameter of the target access network device reaches a switching threshold, switch from the source access network device to the target access network device, in which the first reference switching parameter includes at least one of an RSRQ and an RSRP of the target access network device; or the processing module 710 is further configured to, in response to determining that a ratio of the first reference switching parameter of the target access network device to the second AI computing power factor value reaches a switching threshold, switch from the source access network device to the target access network device; or the processing module 710 is further configured to, in response to determining that a sum of a second reference switching parameter of the source access network device and the second AI computing power factor value is less than a switching threshold, switch from the source access network device to the target access network device, in which the second reference switching parameter includes at least one of an RSRQ and an RSRP of the source access network device; or the processing module 710 is further configured to, in response to determining that a product of the second reference switching parameter of the source access network device and the second AI computing power factor value is less than a switching threshold, switch from the source access network device to the target access network device.

In an optional embodiment, the processing module 710 is further configured to determine a second AI computing power factor value of the target access network device; and, in response to determining that the second AI computing power factor value is equal to or greater than a second threshold, determine the device switching situation of switching between the source access network device and the target access network device by taking the second AI computing power factor value as a forward offset parameter.

In an optional embodiment, the processing module 710 is further configured to, in response to determining that a sum of a first reference switching parameter of the target access network device and the second AI computing power factor value reaches a switching threshold, switch from the source access network device to the target access network device, in which the first reference switching parameter includes at least one of an RSRQ and an RSRP of the target access network device; or the processing module 710 is further configured to, in response to determining that a product of the first reference switching parameter of the target access network device and the second AI computing power factor value reaches a switching threshold, switch from the source access network device to the target access network device; or the processing module 710 is further configured to, in response to determining that a sum of an opposite number of the second AI computing power factor value and a second reference switching parameter of the source access network device is less than a switching threshold, switch from the source access network device to the target access network device, in which the second reference switching parameter includes at least one of an RSRQ and an RSRP of the source access network device; or the processing module 710 is further configured to, in response to determining that a ratio of the second reference switching parameter of the source access network device to the second AI computing power factor value is less than a switching threshold, switch from the source access network device to the target access network device.

In an optional embodiment, the processing module 710 is further configured to determine a first AI computing power factor value of the source access network device and a second AI computing power factor value of the target access network device; determine a computing power factor value difference between the second AI computing power factor value and the first AI computing power factor value; and, in response to determining that the computing power factor value difference is equal to or greater than a third threshold, determine the device switching situation of switching between the source access network device and the target access network device by taking the computing power factor value difference as a forward offset parameter.

In an optional embodiment, the processing module 710 is further configured to, in response to determining that a sum of a switching parameter difference and the computing power factor value difference reaches a switching threshold, switch from the source access network device to the target access network device, in which the switching parameter difference is a difference between the first reference switching parameter of the access network device and the second reference switching parameter of the source access network device; or the processing module 710 is further configured to, in response to determining that a product of the switching parameter difference and the computing power factor value difference reaches a switching threshold, switch from the source access network device to the target access network device.

In an optional embodiment, the processing module 710 is further configured to determine a first AI computing power factor value of the source access network device and a second AI computing power factor value of the target access network device; determine a computing power factor value difference between the second AI computing power factor value and the first AI computing power factor value; and, in response to determining that the computing power factor value difference is less than or equal to a third threshold, determine the device switching situation of switching between the source access network device and the target access network device by taking the computing power factor value difference as a reverse offset parameter.

In an optional embodiment, the processing module 710 is further configured to, in response to determining that a sum of an opposite number of the computing power factor value difference and a switching parameter difference reaches a switching threshold, switch from the source access network device to the target access network device, in which the switching parameter difference is a difference between a first reference switching parameter of the target access network device and a second reference switching parameter of the source access network device; or the processing module 710 is further configured to, in response to determining that a ratio of the switching parameter difference and the computing power factor value difference reaches a switching threshold, switch from the source access network device to the target access network device.

In an optional embodiment, the processing module 710 is further configured to convert an AI computing power of the access network device according to a preset conversion to acquire the AI computing power factor value. The preset conversion includes at least one of a linear conversion, an exponential conversion, or a logarithmic conversion.

Therefore, in the device switching apparatus provided in the embodiments, the AI computing power factor value of the access network device is used as the offset parameter. When determining whether to switch from the source access network device to the target access network device, the original determination process is offset according to the AI computing power factor value. In a case where the AI computing power factor value indicates that the AI computing power is suitable for switching, the offset is performed in a forward offset direction to complete the determination of the switching between the access network devices. Similarly, in a case where the AI computing power factor indicates that the AI computing power is not suitable for switching, the offset is performed in a reverse offset direction to complete the determination of the switching between the access network devices. In this way, the accuracy in the process of device switching is improved.

Figure 8:
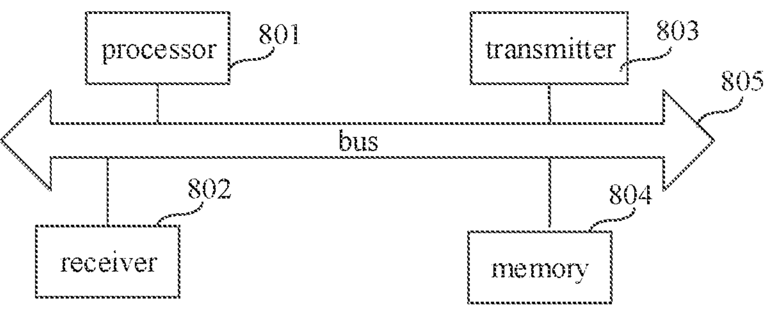
FIG. 8 is a block diagram of a terminal according to an embodiment of the present disclosure.

FIG. 8 is a block diagram of a terminal according to an embodiment of the present disclosure. The terminal includes a processor 801, a receiver 802, a transmitter 803, a memory 804, and a bus 805.

The processor 801 includes one or more processing cores, and the processor 801 performs various functional applications and information processing by executing software programs and modules. The receiver 802 and the transmitter 803 may be implemented as a communication component, which may be a communication chip. The memory 804 is connected to the processor 801 through the bus 805. The memory 804 may be configured to store at least one instruction, and the processor 801 may be configured to execute the at least one instruction to implement the various operations in the above method embodiments.

In addition, the memory 804 may be implemented by any type or combination of volatile or non-volatile storage devices including, but not limited to: magnetic or optical disks, an electrically erasable programmable read only memory (EEPROM), an erasable programmable read only memory (EPROM), a static random access memory (SRAM), a read only memory (ROM), a magnetic memory, a flash memory, and a programmable read only memory (PROM).

In an embodiment, a non-transitory computer-readable storage medium having stored therein instructions, such as a memory including instructions, is further provided, and the instructions can be executed by a processor of a terminal to complete any above-mentioned device switching method which may be executed by the terminal side. For example, the non-transitory computer-readable storage medium may be a ROM, a random access memory (RAM), a CD-ROM, a magnetic tape, a floppy disk, an optical data storage device, and the like.

A non-transitory computer-readable storage medium having stored therein instructions that, when loaded and executed by a processor, causes the processor to implement the device switching method as described above.

Figure 9:
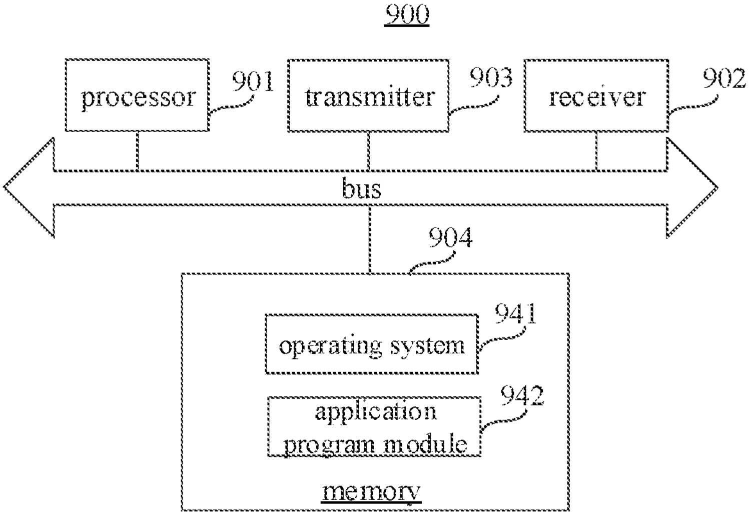
FIG. 9 is a block diagram of an access network device according to an embodiment of the present disclosure.

FIG. 9 is a block diagram of an access network device according to an embodiment of the present disclosure. In some embodiments, the access network device 900 is a base station. The access network device 900 includes: a processor 901, a receiver 902, a transmitter 903 and a memory 904. The receiver 902, the transmitter 903 and the memory 904 are respectively connected to the processor 901 through a bus.

The processor 901 includes one or more processing cores, and the processor 901 is configured to execute the operations in the device switching method performed by the access network device side according to the embodiments of the present disclosure by executing software programs and modules. The memory 904 may be configured to store software programs and modules. Specifically, the memory 904 may be configured to store an operating system 941 and an application program module 942 required for at least one function. The receiver 902 is configured to receive communication data sent by other devices, and the transmitter 903 is configured to send communication data to other devices.

In embodiments of the present disclosure, a communication system including a terminal and an access network device is provided. The terminal includes the device switching apparatus provided in the embodiment shown in FIG. 7.

In embodiments of the present disclosure, a communication system including a terminal and an access network device is provided. The terminal includes the terminal provided in the embodiment shown in FIG. 8, and the access network device includes the access network device provided in the embodiment shown in FIG. 9.

In embodiments of the present disclosure, a non-transitory computer-readable storage medium is provided. The non-transitory computer-readable storage medium has stored therein at least one instruction, at least one program, a set of codes, or a set of instructions that, when loaded and executed by a processor, causes the processor to implement operations/steps (performed by the terminal or the access network device) of the device switching method according to any embodiment as described above.

It should be understood that term "a plurality of" used herein means two or more. Expression "and/or" indicating an association relationship of the associated objects, refers to three possible relationships. For example, A and/or B, refers to a first case where A exists alone, a second case where both A and B exist, and a third case where B exists alone, Character "/" generally indicates a conjunction "or" between the associated objects.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as illustrated only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A device switching method, applied to a terminal device, the method comprising:

receiving a downlink signaling including an indication field indicating a second artificial intelligence (AI) computing power factor value of a target access network device;

determining a computing power factor value difference by subtracting a first AI computing power factor value from the second AI computing power factor value;

in response to the difference being greater than or equal to a third threshold, determining the difference as a forward offset parameter; and switching when a sum of a switching parameter difference and the computing power factor value difference is greater than or equal to a switching threshold, wherein the switching parameter difference is based on a reference signal receiving power (RSRP) or a reference signal receiving quality (RSRQ) of the target access network device and a source access network device;

wherein the first AI computing power factor value and the second AI computing power factor value respectively indicate a maximum AI computing power or a maximum available AI computing power of the source access network device and the target access network device, and the maximum AI computing power and the maximum available AI computing power include a maximum memory occupancy, a maximum central processing unit (CPU) occupancy or a maximum storage occupancy supported by the terminal for an AI computing power.

2. The method according to claim 1, wherein determining the device switching situation of switching between the source access network device and the target access network device by taking the first AI computing power factor value as the forward offset parameter comprises at least one of:

in response to determining that a sum of a first reference switching parameter of the target access network device and the first AI computing power factor value reaches a switching threshold, switching from the source access network device to the target access network device, wherein the first reference switching parameter comprises at least one of the RSRQ and the RSRP of the target access network device;

in response to determining that a product of the first reference switching parameter of the target access network device and the first AI computing power factor value reaches a switching threshold, switching from the source access network device to the target access network device;

in response to determining that a sum of an opposite number of the first AI computing power factor value and a second reference switching parameter of the source access network device is less than a switching threshold, switching from the source access network device to the target access network device, wherein the second reference switching parameter comprises at least one of the RSRQ and the RSRP of the source access network device; or in response to determining that a ratio of the second reference switching parameter of the source access network device to the first AI computing power factor value is less than a switching threshold, switching from the source access network device to the target access network device.

3. The method according to claim 1, wherein determining the device switching situation comprises:

determining the first AI computing power factor value of the source access network device; and in response to determining that the first AI computing power factor value is equal to or greater than a first threshold, determining the device switching situation of switching between the source access network device and the target access network device by taking the first AI computing power factor value as a reverse offset parameter.

4. The method according to claim 3, wherein determining the device switching situation of switching between the source access network device and the target access network device by taking the first AI computing power factor value as the reverse offset parameter comprises at least one of:

in response to determining that a sum of an opposite number of the first AI computing power factor value and a first reference switching parameter of the target access network device reaches a switching threshold, switching from the source access network device to the target access network device, wherein the first reference switching parameter comprises at least one of the RSRQ and the RSRP of the target access network device;

in response to determining that a ratio of the first reference switching parameter of the target access network device to the first AI computing power factor value reaches a switching threshold, switching from the source access network device to the target access network device;

in response to determining that a sum of a second reference switching parameter of the source access network device and the first AI computing power factor value is less than a switching threshold, switching from the source access network device to the target access network device, wherein the second reference switching parameter comprises at least one of the RSRQ and the RSRP of the source access network device; or in response to determining that a product of the second reference switching parameter of the source access network device and the first AI computing power factor value is less than a switching threshold, switching from the source access network device to the target access network device.

5. The method according to claim 1, wherein determining the device switching situation comprises:

determining the second AI computing power factor value of the target access network device; and in response to determining that the second AI computing power factor value is less than or equal to a second threshold, determining the device switching situation of switching between the source access network device and the target access network device by taking the second AI computing power factor value as a reverse offset parameter.

6. The method according to claim 5, wherein determining the device switching situation of switching between the source access network device and the target access network device by taking the second AI computing power factor value as the reverse offset parameter comprises at least one of:

in response to determining that a sum of an opposite number of the second AI computing power factor value and a first reference switching parameter of the target access network device reaches a switching threshold, switching from the source access network device to the target access network device, wherein the first reference switching parameter comprises at least one of the RSRQ and the RSRP of the target access network device;

in response to determining that a ratio of the first reference switching parameter of the target access network device to the second AI computing power factor value reaches a switching threshold, switching from the source access network device to the target access network device;

in response to determining that a sum of a second reference switching parameter of the source access network device and the second AI computing power factor value is less than a switching threshold, switching from the source access network device to the target access network device, wherein the second reference switching parameter comprises at least one of the RSRQ and the RSRP of the source access network device; or in response to determining that a product of the second reference switching parameter of the source access network device and the second AI computing power factor value is less than a switching threshold, switching from the source access network device to the target access network device.

7. The method according to claim 1, wherein determining the device switching situation comprises:

determining the second AI computing power factor value of the target access network device; and in response to determining that the second AI computing power factor value is equal to or greater than a second threshold, determining the device switching situation of switching between the source access network device and the target access network device by taking the second AI computing power factor value as a forward offset parameter.

8. The method according to claim 7, wherein determining the device switching situation of switching between the source access network device and the target access network device by taking the second AI computing power factor value as the forward offset parameter comprises at least one of:

in response to determining that a sum of a first reference switching parameter of the target access network device and the second AI computing power factor value reaches a switching threshold, switching from the source access network device to the target access network device, wherein the first reference switching parameter comprises at least one of the RSRQ and the RSRP of the target access network device;

in response to determining that a product of the first reference switching parameter of the target access network device and the second AI computing power factor value reaches a switching threshold, switching from the source access network device to the target access network device;

in response to determining that a sum of an opposite number of the second AI computing power factor value and a second reference switching parameter of the source access network device is less than a switching threshold, switching from the source access network device to the target access network device, wherein the second reference switching parameter comprises at least one of the RSRQ and the RSRP of the source access network device; or in response to determining that a ratio of the second reference switching parameter of the source access network device to the second AI computing power factor value is less than a switching threshold, switching from the source access network device to the target access network device.

9. The method according to claim 1, wherein determining the device switching situation comprises:

determining the first AI computing power factor value of the source access network device and the second AI computing power factor value of the target access network device;

determining a computing power factor value difference between the second AI computing power factor value and the first AI computing power factor value; and in response to determining that the computing power factor value difference is less than or equal to a third threshold, determining the device switching situation of switching between the source access network device and the target access network device by taking the computing power factor value difference as a reverse offset parameter.

10. The method according to claim 9, wherein determining the device switching situation of switching between the source access network device and the target access network device by taking the computing power factor value difference as the reverse offset parameter comprises:

in response to determining that a sum of an opposite number of the computing power factor value difference and a switching parameter difference reaches a switching threshold, switching from the source access network device to the target access network device, wherein the switching parameter difference is a difference between a first reference switching parameter of the target access network device and a second reference switching parameter of the source access network device, wherein the first reference switching parameter comprises at least one of the RSRQ and the RSRP of the target access network device, and the second reference switching parameter comprises at least one of the RSRQ and the RSRP of the source access network device; or in response to determining that a ratio of the switching parameter difference and the computing power factor value difference reaches a switching threshold, switching from the source access network device to the target access network device.

11. The method according to claim 1, further comprising:

converting an AI computing power of the source access network device and converting an AI computing power of the target access network device according to a preset conversion to acquire the first AI computing power factor value and second AI computing power factor value respectively;

wherein the preset conversion comprises at least one of a linear conversion, an exponential conversion, or a logarithmic conversion.

12. A terminal, comprising:

a processor; and a memory having stored therein instructions executable by the processor, wherein the processor is configured to:

receiving a downlink signaling including an indication field indicating a second artificial intelligence (AI) computing power factor value of a target access network device;

determining a computing power factor value difference by subtracting a first AI computing power factor value from the second AI computing power factor value;

in response to the difference being greater than or equal to a third threshold, determining the difference as a forward offset parameter; and switching when a sum of a switching parameter difference and the computing power factor value difference is greater than or equal to a switching threshold, wherein the switching parameter difference is based on a reference signal receiving power (RSRP) or a reference signal receiving quality (RSRQ) of the target access network device and a source access network device;

wherein the first AI computing power factor value and the second AI computing power factor value respectively indicate a maximum AI computing power or a maximum available AI computing power of the source access network device and the target access network device, and the maximum AI computing power and the maximum available AI computing power include a maximum memory occupancy, a maximum central processing unit (CPU) occupancy or a maximum storage occupancy supported by the terminal for an AI computing power.

13. The terminal according to claim 12, wherein the processor is further configured to:

determine the second AI computing power factor value of the target access network device; and in response to determining that the second AI computing power factor value is less than or equal to a second threshold, determine the device switching situation of switching between the source access network device and the target access network device by taking the second AI computing power factor value as a reverse offset parameter, or in response to determining that the second AI computing power factor value is equal to or greater than the second threshold, determine the device switching situation of switching between the source access network device and the target access network device by taking the second AI computing power factor value as a forward offset parameter.

14. The terminal according to claim 12, wherein the processor is further configured to:

determine the first AI computing power factor value of the source access network device and a second AI computing power factor value of the target access network device;

determine a computing power factor value difference between the second AI computing power factor value and the first AI computing power factor value; and in response to determining that the computing power factor value difference is equal to or greater than a third threshold, determine the device switching situation of switching between the source access network device and the target access network device by taking the computing power factor value difference as a forward offset parameter.

15. The terminal according to claim 12, wherein the processor is further configured to:

determine the first AI computing power factor value of the source access network device and the second AI computing power factor value of the target access network device;

determine a computing power factor value difference between the second AI computing power factor value and the first AI computing power factor value; and in response to determining that the computing power factor value difference is less than or equal to a third threshold, determine the device switching situation of switching between the source access network device and the target access network device by taking the computing power factor value difference as a reverse offset parameter.

16. A non-transitory computer-readable storage medium having stored therein at least one instruction, at least one program, a set of codes, or a set of instructions that, when loaded and executed by a processor, causes the processor to perform a device switching method, the method comprising:

receiving a downlink signaling including an indication field indicating a second artificial intelligence (AI) computing power factor value of a target access network device;

determining a computing power factor value difference by subtracting a first AI computing power factor value from the second AI computing power factor value;

in response to the difference being greater than or equal to a third threshold, determining the difference as a forward offset parameter; and switching when a sum of a switching parameter difference and the computing power factor value difference is greater than or equal to a switching threshold, wherein the switching parameter difference is based on a reference signal receiving power (RSRP) or a reference signal receiving quality (RSRQ) of the target access network device and a source access network device;

wherein the first AI computing power factor value and the second AI computing power factor value respectively indicate a maximum AI computing power or a maximum available AI computing power of the source access network device and the target access network device, and the maximum AI computing power and the maximum available AI computing power include a maximum memory occupancy, a maximum central processing unit (CPU) occupancy or a maximum storage occupancy supported by a terminal for an AI computing power.

* * * * *